E. F. A. CAREY.
ELECTRIC INCUBATOR.
APPLICATION FILED JUNE 16, 1914.
1,113,955.
Patented Oct. 20, 1914.
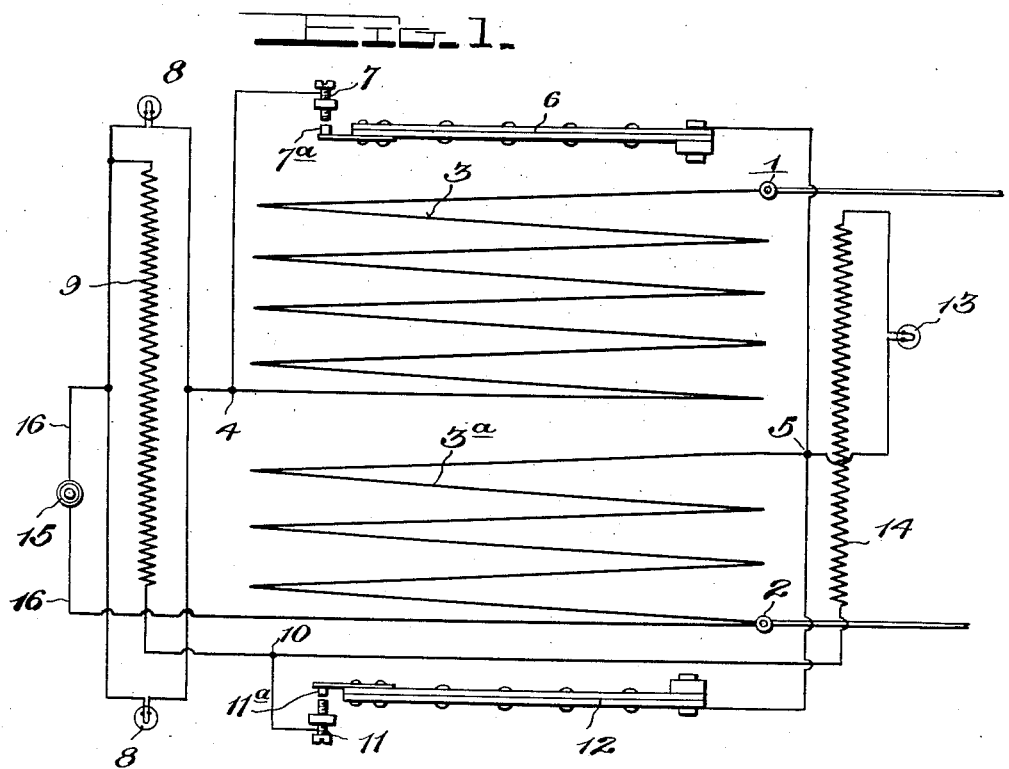
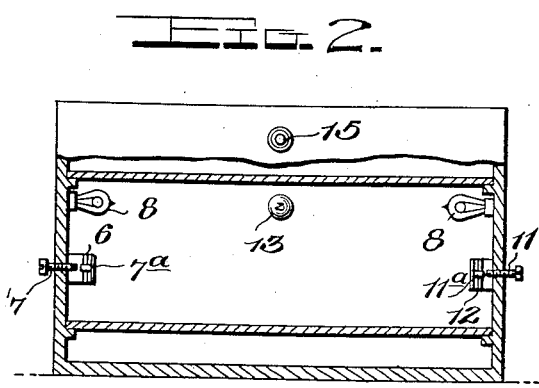
Eugene F. A. Carey,
Inventor
Witnesses
By Lester L. Sargent.
Attorney

UNITED STATES PATENT OFFICE.

EUGENE F. A. CAREY, OF MISSOULA, MONTANA.

ELECTRIC INCUBATOR.

1,113,955. Specification of Letters Patent. Patented Oct. 20, 1914.

Application filed June 16, 1914. Serial No. 845,432.

*To all whom it may concern:*

Be it known that I, EUGENE F. A. CAREY, a citizen of the United States, residing at Missoula, in the county of Missoula and State of Montana, have invented a new and useful Electric Incubator, of which the following is a specification.

The object of my invention is to provide novel connections for an electric incubator, having a novel combination and arrangement of parts for the purpose of maintaining an approximately constant temperature in the egg chamber, and providing novel means for regulating the temperature and preventing sudden variations thereof.

It is also an object of my invention to provide a device in which the contact points of the thermostat are not liable to interfere with the successful working of the incubator.

It is also an object of my invention to provide lamps for indicating what circuits are in operation; and further to provide novel means for illuminating the interior of the egg chamber when desired.

Heretofore the usual practice in electric incubators has been to bring the temperature of the incubating chamber to a point determined by the thermostat, at which temperature the circuit is opened by the thermostat, and the incubator begins to cool. When the temperature drops below that for which the thermostat is set, the circuit is closed and the egg chamber is again heated up. Dangerous fluctuations in temperature are produced in such incubators. In some incubators the circuit is not completely broken when the thermostat opens; but such a high resistance is introduced in series with the heating element that the effect is virtually the same as if the circuit were completely broken.

It is the object of my invention to provide means for maintaining a constant predetermined temperature.

Referring to the accompanying drawings, illustrative of my invention Figure 1 is a top plan of the invention as arranged in an incubator; Fig. 2 is a side view illustrating position of lamps and thermostats in the incubator.

My heating means is composed of three parts or circuits, all connected in series, and all within the egg chamber of the incubator.

The first electric circuit or heater includes resistance members 3 and 3ª, having terminals 1 and 2, respectively connecting with service wires. A thermostat 6 when closed completes the circuit between members 3 and 3ª. This thermostat is set to open at slightly below the incubating temperature.

The second part or circuit is connected in series with the first circuit, as indicated at points 4 and 5, and has a resistance or heating member 9. The combined resistance of the two circuits is such as to maintain the egg chamber at the incubating temperature, under ordinary conditions. I provide low voltage lamps 8, 8, in the second circuit as illustrated, to indicate when it is in operation. A second thermostat, 12, set at the incubating temperature is normally closed, and constitutes a part of the second circuit.

The third part or circuit in my incubator is connected in series with the second circuit at point 10 and with the first circuit at point 5, and is provided with a resistance member 14. This third circuit is also provided with a low voltage lamp 13, to indicate when it is in operation. When in operation, the third circuit tends to lower the temperature of the incubating chamber. It is within the scope of my invention to vary the number of lamps in either of the circuits.

Referring to the illustrations, 7ª indicates a non-corroding contact point of thermostat 6. Screw 7 regulates the opening of the thermostat. Thermostat 12 is provided with non-corroding contact point 11ª and is regulated by means of screw 11.

The novel means for illuminating the egg chamber in my incubator include a push button 15 and electric connections 16 between lamps 8—8 and supply terminal 2. This affords means for putting the full lamp voltage across through lamps 8, 8 and thus lighting up the interior of the incubator, the parts being disposed preferably as shown in the drawings. (Note Fig. 3.)

The operation of my incubator is effected by a current from the service wires passing through the first circuit, as above disclosed, which heats the egg chamber fairly rapidly to almost the incubating temperature when thermostat 6 in this first circuit is adjusted to open and introduce the second circuit and resistance or heating member 9 in series with the first circuit. The combined resistance of these two circuits is such that just sufficient heat is furnished, under usual conditions, to maintain the incubating temperature in the chamber. If the temperature continues to rise, which might happen by a rise in the supply voltage, thermostat 12 which forms a part of the second circuit opens and breaks the circuit and introduces the third circuit in series with the second and first. The combined resistance of the three circuits is such that less heat is supplied to the egg chamber than escapes from the heated chamber by conduction through its walls, and the temperature falls. By this arrangement a more constant temperature is maintained in the egg chamber and the contact points of the thermostat are less likely to become foul and obstruct the successful working of the incubator.

Lamps 8, 8 are dimly lighted when the second circuit is in operation, and a similar lamp 13, is dimly lighted when the third circuit is also in operation, and all the contact points open.

When it is desired to illuminate the interior of the egg chamber to observe the temperature from a thermometer therein, push button 15 is held depressed and the full lamp voltage put across the terminals of lamps 8, 8. All of the lamps used in the incubator consume a small amount of energy so as not to disturb the equality of temperature in the egg chamber.

The phrase "heater circuit" hereinafter used shall be construed as a circuit in which a heater is included.

What I claim is:

In an electric incubator, a heater circuit; a second heater circuit connected therewith; a thermostat controlling the operation of the second circuit at a predetermined temperature; a third circuit connected with the first and second circuits; and a thermostat in the second circuit controlling the operation of the third circuit at a predetermined temperature higher than that at which the first thermostat is operated; one or more low voltage lamps in series in the second and third circuits; and electrical connections including a push button, connecting lamps in the second circuit directly with the supply terminal of the first circuit for putting full voltage across the terminals of the lamps, whereby the interior of the incubator may be illuminated substantially as described.

In testimony whereof I hereunto affix my signature, in the presence of two witnesses.

EUGENE F. A. CAREY.

Witnesses:
P. J. O'BRIEN,
JOHN D. JONES.